United States Patent
Seligman (10) Patent No.: US 7,042,454 B1
(45) Date of Patent: May 9, 2006

(54) METHOD AND APPARATUS FOR DISPLAYING DISTRIBUTED MULTIRESOLUTION SCENES

(75) Inventor: Adam L. Seligman, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/428,679

(22) Filed: Oct. 27, 1999

(51) Int. Cl.
*G06T 17/00* (2006.01)

(52) U.S. Cl. ...................... 345/428; 345/541; 345/440; 345/506; 345/505; 709/201; 709/203; 709/205; 709/209

(58) Field of Classification Search ................ 345/428, 345/541, 502, 505, 526, 506; 709/205, 107, 709/201, 203, 817, 209
See application file for complete search history.

(56) References Cited

U.S. PATENT DOCUMENTS

| 5,546,530 | A | * | 8/1996 | Grimaud et al. ............ 395/163 |
| 5,675,721 | A | * | 10/1997 | Freedman et al. .......... 395/129 |
| 5,963,209 | A | * | 10/1999 | Hoppe ......................... 345/419 |
| 6,330,583 | B1 | * | 12/2001 | Reiffin ......................... 718/105 |

\* cited by examiner

*Primary Examiner*—Kimbinh T. Nguyen (57) ABSTRACT

A visualization console acquires a 3D data set representing a 3D scene. The visualization console then transfers at least some of the 3D objects within the 3D scene to a pool of workstations. The collection of workstations associates an identifier with each of the 3D objects, and manages the storage of these 3D objects. Sometime later, the visualization console sends a request to the pool of workstations for the data needed to render a 3D object contained in the workstation. The workstations perform multiresolution modeling computation and create a different set of models with the appropriate level of detail for the 3D object identified by the request. The workstations then send the mesh representation of the 3D objects requested to the visualization console for display. The visualization console will thus be able to render these models more efficiently than prior systems that either render the complete 3D scene or perform multiresolution computation by themselves.

24 Claims, 3 Drawing Sheets

METHOD AND APPARATUS FOR DISPLAYING DISTRIBUTED MULTIRESOLUTION SCENES

BACKGROUND OF THE INVENTION

1. Technical Field

The present invention relates generally to the storage and display of computer graphics. Specifically, the present invention manipulates and displays large sets of three-dimensional data using several discrete computer systems which operate together.

2. Description of the Related Art

Computers are often used for the manipulation and display of graphical data, and computer users expect increasing levels of sophistication and realism in these systems. Interactive graphics have often been limited to two dimensional (2D) images and animated sequences, because the storage and computational requirements may be met with a typical computer system. Now, however, interaction with three dimensional (3D) scenes is utilized in many applications. These 3D scenes are often more difficult to manage than 2D graphics because of the storage and computational requirements necessary to properly view a 3D scene. Factors such as geometry and lighting calculations, applications of textures and other surface features must all be analyzed to accurately depict the 3D scene. Both the computation and storage of these elements are demanding of computer systems. However, due to advances in computer technology, modest amounts of 3D data can be rendered into images and displayed using generally available personal computers. But, very high-quality 3D scenes can require the storage and manipulation of more 3D data than a single personal computer can efficiently handle. Thus, the development of computer systems which can manipulate and display ever larger amounts of 3D data for generating high-quality graphic images is ongoing.

One solution has been to improve the hardware and software that converts 3D scene data into a sequence of images for display. However, the "3D rendering algorithms" used to accomplish this task are relatively advanced and only modest improvements have occurred in the past few years. The integrated circuits used for rendering have made significant advances, along with the progress of integrated circuits in general, but each new generation yields only incremental performance increases.

Another approach to improve the performance of 3D rendering algorithms relates to displaying only a portion of the 3D data at one time. By omitting large parts of data from the rendering process, the algorithm may execute more quickly. However, systems which rely solely on this method often are forced to omit relevant parts of the 3D scene. In essence, a "close up" view of one portion of the 3D scene is all that can be displayed. This characteristic is often unacceptable for users.

Multiresolution modeling represents yet another approach for efficiently manipulating and displaying 3D data sets. Multiresolution modeling techniques operate on the principle that some elements that make up a 3D scene are of less importance than others. For example, items in the background of a 3D scene might be represented in less detail than items in the foreground. These techniques correspond to the way people view the world around them. People perceive objects located far away as being generally smaller and containing less detail as compared to nearby objects. Computer systems employing multiresolution modeling techniques generally take advantage of this characteristic of human perception by illustrating objects located in the background of a 3D scene with less detail than those located in the foreground.

For example, a high-resolution image of a house could contain data which represents the contours of each brick, the leaves of shrubs in front of the house, the individual shingles on the roof, and so on. In a 3D scene, if the house is located in the immediate foreground, all of the data representing the details described above may have to be recalled from some storage device (e.g., a hard disk or CD-ROM), transmitted to the graphics processor, and then rendered. On the other hand, if the house were in the far background, the bricks could be represented as simple rectangles of a single color, without any contours, and the shrubs and roof could be similarly simplified. The amount of data required to represent a low-resolution 3D model of the house is much less than is required to represent the high-resolution 3D model. Processing lower resolution 3D data results in faster rendering of the data into images, as the smaller data set size allows for a lightened computational load for the computer system.

Figure 1:
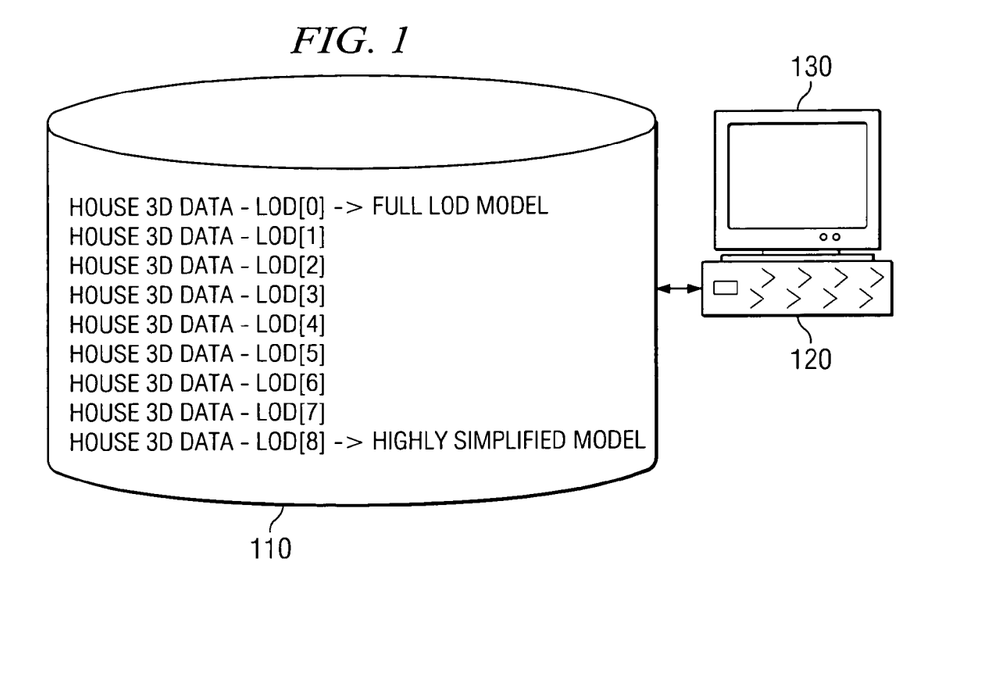
FIG. 1 depicts a prior art computer graphics system.

Multiresolution modeling appears to be an efficient method for lessening the data sizes used to render, however, it does have its drawbacks. These drawbacks tend to adversely impact either disk storage space or processing resources. FIG. 1 illustrates an example of how implementing multiresolution modeling on a computer system can consume large amounts of the computer's data storage (e.g., disk space or RAM). As shown in FIG. 1, several versions of 3D data representing the house discussed above are stored at varying levels of detail (LOD). The model designated as LOD[0] contains all of the details of the house, while model LOD[8] is a highly simplified model, with few detail. Models LOD[1] through LOD[7] contain intermediate levels of detail. When the 3D model of the house is required for the rendering of an image, workstation 120 determines the appropriate detail needed for the rendered house to have good visual qualities, then recalls the data representing the house at the appropriate LOD from storage 110. Next, workstation 120 uses this LOD model of the house in its graphics subsystem, which renders it to display 130. The problem with this method is that multiple data sets representing the same house at varying LOD have to be stored in storage 110. These redundant models consume more storage space than a single model and therefore represent an inefficient aspect of this implementation of the multiresolution modeling technique. The storage penalty is particularly large if many LOD versions are stored for higher visual quality.

Some more sophisticated multiresolution imaging techniques use what are known as progressive techniques. Progressive techniques allow a single high-resolution 3D data set to be transformed into other data sets with an almost unlimited LOD. In particular, Hughues Hoppes' Progressive Mesh (PM) represents an advanced multiresolution progressive technique. In 3D graphics, vertices in 3D spaces describe polygons. Polygons are the basic building blocks in traditional 3D graphics. PM techniques generally operate on the collection of vertices that describe the surfaces of objects.

Using PM techniques, a 3D data set representing a complex object is converted into a simplified form made of many fewer vertices and a list (or stream) of "mesh operations" that can extend this data back into the complete 3D data set. The more a computer system utilizes the stream, the more details of the object represented by the 3D data will be available. A short prefix of the stream generates a low LOD version of the object, while a longer prefix of the stream generates a higher LOD version of the object. One benefit of PM techniques is that redundant copies of the model do not have to be stored at varying LOD, as the system can generate an LOD model needed dynamically. However, PM techniques generally require a significant amount of processing resources to convert a model from one LOD to another.

Thus, it would be desirable to create a computer system which uses PM techniques for high visual quality given the constraints of available hardware. However, such a system should not suffer excessive performance penalties associated with constructing lower-resolution data sets from the high-resolution sets, or the benefit of multiresolution modeling is lost.

SUMMARY OF THE INVENTION

This invention is a method of utilizing a collection of computers ("pool") to both store the 3D scene and assist in multiresolution processing. In one embodiment of the present invention, a visualization console acquires a 3D data set representing a 3D scene. The visualization console then transfers the 3D objects within the scene to a pool of other computers. These other computers associate identifiers with the 3D objects and store the 3D data across the pool of machines. Sometime later, the visualization console sends a request to the pool of storage computers for the data needed to render a view of the scene. After receiving the request, the pool of storage computers generates the 3D model with the appropriate LOD for each object, as specified by the request. The pool of storage computers then sends the appropriate LOD representation of the 3D objects to the visualization console for display in the requested scene. The visualization console hence does not need to necessarily perform any multiresolution processing, freeing its computation resources for rendering or other processes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 2:
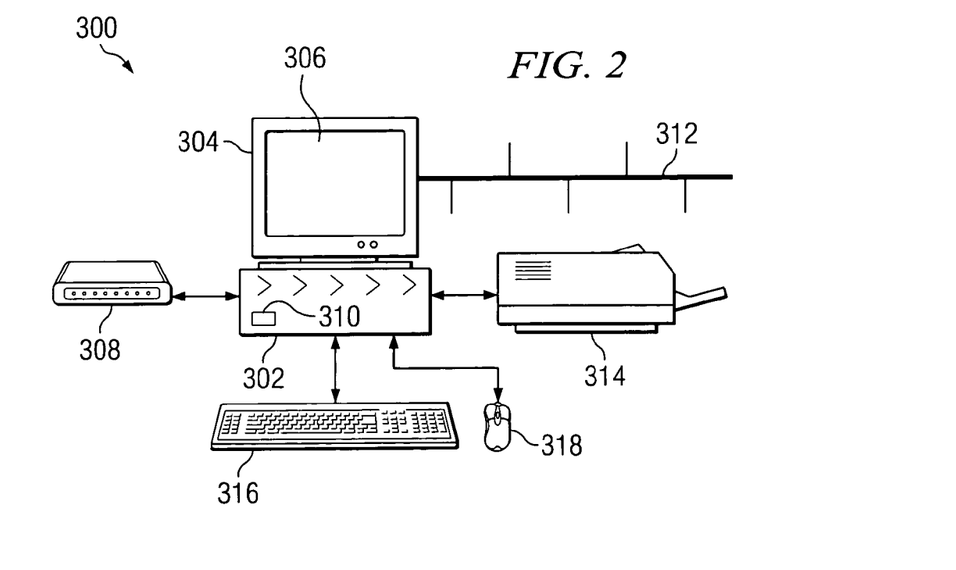
FIG. 2 depicts a computer upon which the present invention can be implemented.

FIG. 2 depicts data processing system 300, which includes processor 302 and display 304. Display 304 includes display screen 306, which may be implemented utilizing a cathode ray tube (CRT), a liquid crystal display (LCD), a thin film transistor (TFT) panel, or the like. Data can be entered into data processing system 300 by means of a mouse 318 or keyboard 316. In addition to mouse 318 and keyboard 316, data can be entered using a track ball, joystick, touch sensitive tablet or screen, trackpad, or glide-pad. Mouse 318 may be utilized to move a pointer or cursor on display screen 306. Processor 302 may also be coupled to one or more peripheral devices, such as modem 308 or disk drive 310, each of which may be internal or external to the enclosure of processor 302. Data processing system 300 may also be connected to network 312 in order to communicate with other computer units. Network 312 may be a local intranet (e.g., a LAN or WAN), or the network of computers known as the Internet, or both. An output device such a printer 314 may also be coupled to processor 302.

Those persons skilled in the art of computer system design should recognize that display 304, keyboard 316, and the pointing device 318 may each be implemented utilizing any one of several known off-the-shelf components. Data processing system 300 may be implemented utilizing any general purpose computer or so-called "personal computer," "workstation," or "server," such as those sold by Compaq and others.

Figure 3:
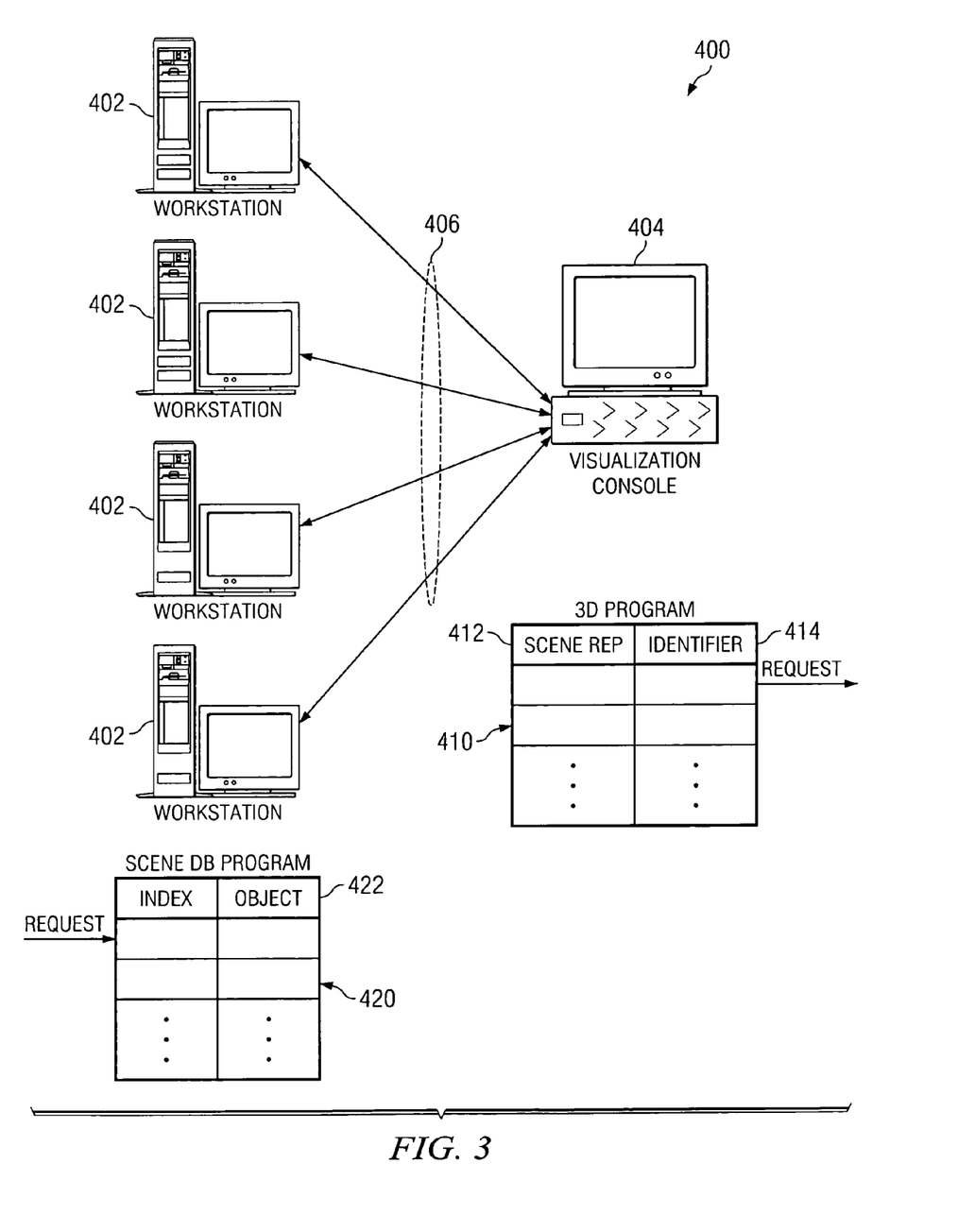
FIG. 3 depicts a network of computers upon which the present invention can be implemented.

FIG. 3 illustrates a computer network according to the present invention. Visualization console 404 is connected to workstations 402 by communication links 406. Executing on visualization console 404 is a 3D application program 410. This program provides a user interface and directs the operation of the graphics subsystem on visualization console 404. Also, the 3D application program manages information related to the 3D scenes that can be viewed on visualization console 404. Generally, the information for a given scene is contained in a data structure known as a scene representation 412. In the present invention, these scene representations 412 contain identifiers 414 for each object in a 3D scene, as well as the location of each object in the scene. In prior art implementations, the scene representations contained the 3D geometry and other data that described all the objects in the scene. However, in the present invention, preferably only identifiers 414 and locations for the objects are contained in the scene representation. The bulk of the information representing the objects is stored, at least in part, on workstations 402. The 3D application program uses the identifiers 414 as references to the objects 422 located on workstations 402. In a preferred embodiment of the present invention, the information representing the objects 422 will be stored in database structures on workstations 402, and the identifier 414 will be used as indexes into these databases.

Operating on each workstation 402 is a scene database program 420. The scene database program 420 stores the 3D and other data representing the objects 422 in a given scene and processes this information upon receiving instructions from visualization console 404. Each workstation 402 can store the 3D data for an entire scene, or the scene can be divided between the various workstations in order to facilitate parallel processing of the scene.

To display an image on visualization console 404, a request is sent to workstations 402. This request contains the identifier 414 of the objects to be displayed. The scene database programs 420 operating on workstations 402 receive the request, then each of workstations 402 begins to construct the objects 422 specified in the requests. This construction process consists, in part, of retrieving the object 422 specified by the identifier 414 contained in the request from a storage medium (e.g., a disk or RAM) accessible by the workstation, and performing some multiresolution and other 3D processing on the object. After workstations 402 have retrieved and processed the specified objects 422, the appropriate LOD models and other data representing the 3D scene are sent to visualization console 404 to be displayed.

In a preferred embodiment of the present invention, workstations 402 are rack mounted Compaq Professional Workstations with 1, 2, or 4, 600 Mz processors, greater than 2 GB of RAM and large hard drives. Visualization console 404 is also a Compaq Professional Workstation which has a high performance rendering pipeline on a 3D OpenGL graphics card as its graphics subsystem. Connecting all of these computers is a Tandem ServerNet, which is a system area network (SAN) that communicates data between the various computer systems at the rate of 1 Gbit/s and which has a low communication latency.

Not shown in FIG. 3 are the various network components such as network interface cards, bridges, routers, and the like, as the inclusion of these devices is understood by one of ordinary skill in the art. Further, the specific arrangement of computer devices mentioned above is but an exemplary embodiment. Other arrangements of computer devices can implement the invention described herein, and these alternative arrangements are within the scope of this invention.

Figure 4:
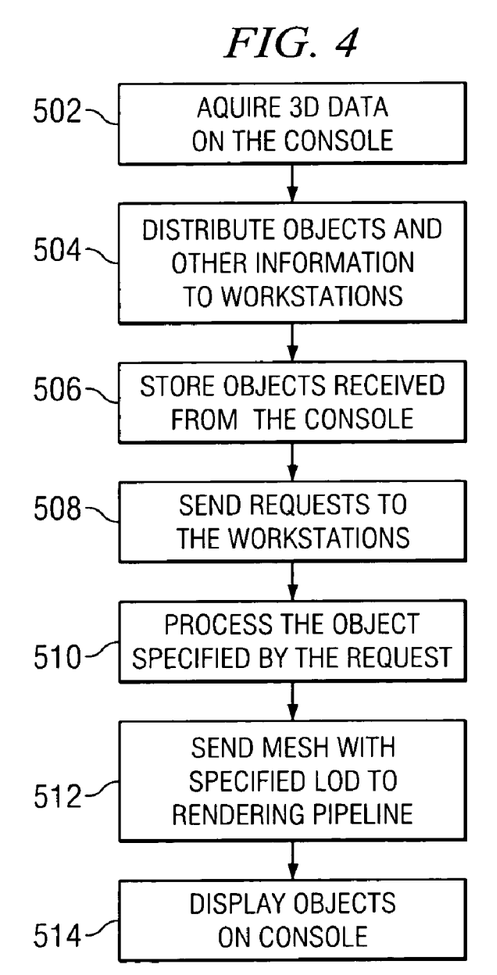
FIG. 4 is a flowchart illustrating a method of displaying a 3D scene according to the present invention.

FIG. 4 is a flowchart illustrating a method for using the network of computers described in FIG. 3 to display a rendered image from a 3D data set. For the sake of clarity, the following discussion will refer to only a single object 422. However, any number of objects up to the limits of the hardware and software, can be loaded, stored, processed, and displayed using the same method. To initialize a visualization console and workstation system, 3D data representing a 3D scene is acquired by the visualization console (step 502). The objects 422 which comprise the scene are then distributed to the workstations, along with their associated identifiers 414 (step 504). Information concerning the geometry, color, and texture of the object 422 is included with the other information about each object. The visualization console works with the pool of workstations to distribute the objects 422 evenly among the pool of workstations, so when the 3D objects are processed, each workstation has approximately the same processing load. The purpose of this distribution is to have each workstation working in parallel with the others. A simple method of distribution is to randomly distribute the objects 422 to the workstations. Heuristics can also be used to distribute the objects 422 between the workstations.

When the objects 422 are received by the workstations, they are inserted into a database and associated with the identifier 414 that was received with the object (step 506). The objects 422 will usually be stored to disk, however, they can also be stored in the workstation's RAM. Objects stored in RAM can be retrieved much faster than objects stored to disk due to the respective access times between the two media.

Sometime later, when a user wishes to view a 3D scene that has been loaded into the workstations in the manner described above, the visualization console sends requests to the workstations to render the 3D scene (508). Normally, the request is formed in response to a user's input that specifies which portion of a given 3D scene the user wishes to view. In one embodiment, the visualization console determines which objects in the 3D scene need to be rendered, then directs the requests to the workstations which contain the objects. In an alternative embodiment, the visualization console can broadcast the parameters which describe the 3D scene the user wishes to view to the workstations. The workstations, instead of the visualization console, then determine which of the objects they manage need to be rendered. Information contained in the request include viewing parameters and lighting information.

Once a workstation receives a request from the visualization console, it uses the identifier 414 for the object to retrieve the representation of the object 422 from a database 420 accessible by the workstation. Once the information for an object 422 is retrieved from the database 420, the workstation will use the information transmitted in the request to create a PM with the appropriate LOD (step 510). During this processing, the workstation converts the PM mesh to a mesh with the specified LOD. This conversion includes computing the visibility and complexity of the object. The workstation then sends the specified LOD mesh representation of the object back to a rendering pipeline on visualization console (step 512). The LOD mesh sent to the visualization console by the workstation is a standard mesh of some resolution. In a preferred embodiment, the visualization console is unaware of the PM processing done by the workstations. The visualization console then displays the 3D data representing the objects 422 as it is received from the workstations (step 514).

In summary, the present invention uses several workstations to improve the speed at which large 3D scenes can be rendered. Full resolution models are converted to LOD models in parallel on the workstations, thereby relieving the visualization console from the storage and computational task associated with the conversion process. Since PM techniques are utilized to simplify the 3D data, the 3D rendering pipeline has to process less data than would otherwise be possible. Operating in this manner allows the 3D rendering pipeline to display images faster while maintaining high visual quality. Also, the use of a high speed network allows the workstations and the visualization console to transfer data very quickly, thereby eliminating most of the performance penalties associated with distributing the processing of the objects.

Aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROMs or CD-ROM disks readable only by a computer I/O attachment); (b) information alterably stored on writable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for utilizing a network of computers to render a three dimensional scene, comprising:

sending a plurality of request from a first computer to a plurality of other computers over a high speed network, the plurality of other computers each storing high resolution three dimensional scene objects, wherein the requests identify selected three dimensional objects stored at the plurality of other computers;

operating the plurality of other computers in parallel to create respective LOD mesh representations of the selected three dimensional objects stored at the other computers; and communicating the respective LOD mesh representations of the selected three dimensional objects from the plurality of other computers in parallel over the network to the first computer, and processing the received LOD mesh representations in a graphics rendering pipeline in the first computer to create solely from the received LOD mesh representations, a display image of a three dimensional scene.

2. The method as recited in claim 1, further comprising:
initially distributing the high resolution three dimensional objects from the first computer for storage by the plurality of other computers; and
associating identifiers with the three dimensional objects.

3. The method as recited in claim 1, wherein the requests include a specified level of detail for creation of the LOD mesh representations from the stored high resolution three dimensional objects.

4. The method as recited in claim 3, wherein the creating step includes creating LOD representations of the three dimensional objects with the specified level of detail as contained in the requests.

5. The method as recited in claim 1, further comprising:
receiving an input from a user on the first computer;
processing the input to determine a first three dimensional scene that corresponds with the input; and
receiving subsequent inputs from the user and processing the inputs to determine subsequent three dimensional scenes that correspond with the subsequent inputs, wherein the user interactively controls the display of the subsequent three dimensional scenes by subsequent inputs.

6. A computer system for rendering a three dimensional scene, comprising:
a visualization console including a graphics processor and a display;
a plurality of workstations, connected to the visualization console by a high speed network to enable the visualization console and the plurality of workstations to operate together;
each of the plurality of workstations storing three dimensional objects, the stored three dimensional objects collectively representing a three dimensional scene; and
the visualization console storing identifiers of each of the three dimensional objects stored at the plurality of workstations;
wherein the visualization console is operable under user control to communicate requests to the plurality of workstations over the high speed network, said requests including identifiers of selected ones of the three dimensional objects stored at the workstations representing a complete selected view of the three dimensional scene;
the workstations are responsive to received requests to operate in parallel to create LOD representations of the respective stored three dimensional objects identified by the requests received from the visualization console for assembling the complete selected view of the three dimensional scene and to communicate the LOD representations of the selected three dimensional objects in parallel to the visualization console for rendering by the visualization console graphics processor to create a composite image display representation by the visualization console display of the selected view of the three dimensional scene, assembled solely from the LOD mesh representations communicated by the workstations to the visualization console.

7. The computer system as recited in claim 6, wherein the requests include a specified level of detail for the LOD representations of the selected three dimensional objects to be created by the workstations.

8. The computer system as recited in claim 7, wherein the workstations create meshes comprising LOD representations of the three dimensional objects with the specified level of detail as contained in the requests.

9. A computer system for rendering a three dimensional scene, comprising:
a visualization console including a graphics processor and a display;
a plurality of workstations, connected to the visualization console by a high speed network;
means for sending request from the visualization console to the plurality of workstations over the high speed network, wherein the requests identify three dimensional objects stored at the plurality of workstations;
the workstations including means operable in parallel for creating a LOD representation of each three dimensional object stored at a respective workstation and that is identified by a request received from the visualization console; and
said workstations also including means for effecting parallel communication of the LOD representations of the three dimensional objects to the visualization console, and
the visualization console including graphics processing means for creating from the received LOD representations of the three dimensional objects, an image display by said visualization console of a three dimensional scene assembled completely from said received LOD representations.

10. The computer system as recited in claim 9, wherein the visualization console includes means for distributing said three dimensional objects for storage at the plurality of workstations over the high speed network.

11. The computer system as recited in claim 9, wherein the requests include a specified level of detail for the LOD representations to be created from the three dimensional objects stored at the workstations.

12. The computer system as recited in claim 9, further comprising:
means for receiving an input from a user on the first computer;
means for processing the input to determine a first three dimensional scene that corresponds with the input; and
means for receiving subsequent inputs from the user and processing the inputs to determine subsequent three dimensional scenes that correspond with the subsequent inputs, wherein the user interactively controls the display of the subsequent three dimensional scenes by his subsequent inputs.

13. A method of displaying a three dimensional scene image, comprising:
from a first computer coupled to a display, transmitting a retrieval request to each of a plurality of second computers storing three dimensional scene objects distributively stored at said second computers together with associated identifiers, said stored three dimensional scene objects collectively representing a three dimensional scene, said retrieval request including identifiers associated with stored scene objects representing at least a portion of the three dimensional scene selected for display;
the second computers retrieving and processing in parallel three dimensional scene objects stored at individual ones of the second computers based on matches between three dimensional scene object identifiers in the received request and three dimensional scene objects stored at the second computers, the processing by the second computers creating respective meshes of the retrieved three dimensional scene objects at a selected level of detail;

the second computers communicating the processed three dimensional scene object meshes in parallel to a graphics rendering pipeline processor in the first computer to render and create a display a representation of the selected portion of the three dimensional scene assembled from the three dimensional scene object meshes communicated by the plurality of second computers to the first computer;

wherein the three dimensional scene objects are stored at the second computers as high resolution models, and the processing carried out by the second computers creates respective meshes of the retrieved three dimensional scene objects at a selected lower level of resolution.

14. The method as recited in claim 13, wherein each three dimensional scene object identifier includes the location of that object in the three dimensional scene.

15. The method as recited in claim 13, wherein the three dimensional scene objects stored at the second computers include information concerning one or more of geometry, color and texture of the object.

16. The method as recited in claim 13, wherein the stored three dimensional scene objects are distributed in a predetermined manner amongst the plurality of second computers.

17. A method of displaying a three dimensional scene image, comprising:

from a first computer coupled to a display, transmitting a retrieval request to each of a plurality of second computers storing three dimensional scene objects distributively stored at said second computers, said retrieval request including parameters describing a selected part of the three dimensional scene to be displayed;

the second computers responding to the retrieval request by selectively retrieving and processing in parallel according to said parameters, three dimensional scene objects stored by the second computers, the processing by the second computers creating respective meshes of the retrieved three dimensional scene objects at a selected level of detail; and the second computers communicating the processed three dimensional scene object meshes in parallel to a graphics rendering pipeline in the first computer to create on said display a representation of the selected part of the three dimensional scene assembled from the three dimensional scene object meshes communicated by the plurality of second computers to the first computer wherein the stored three dimensional scene objects are distributed in a predetermined manner amongst the plurality of second computers, the three dimensional scene objects are stored at the second computers as high resolution models, and the processing carried out by the second computers creates respective meshes of the retrieved three dimensional scene objects at a selected lower level of resolution than the resolution of the stored three dimensional scene object.

18. The method as recited in claim 17, wherein the three dimensional scene objects stored at the second computers each includes information concerning one or more of geometry, color and texture of that stored object; and wherein said request parameters include for each object in the selected portion of the three dimensional scene, an object identifier and the location of that object in the three dimensional scene.

19. A method of displaying a three dimensional scene image, comprising:

initially, from a first computer coupled to a display, transmitting to and distributively storing at a plurality of second computers a plurality of three dimensional scene objects together with associated identifiers, said three dimensional scene objects stored at the second computers collectively representing a three dimensional scene, and storing at the first computer, identifiers for the respective three dimensional scene objects stored at the plurality of second computers;

subsequently, transmitting retrieval request from the first computer to the plurality of second computers, said retrieval requests including identifiers associated with selected ones of the three dimensional scene objects distributively stored at said second computers representing a portion of the three dimensional scene selected for display;

the second computers retrieving and processing in parallel three dimensional scene objects stored at individual ones of the second computers based on each match between a three dimensional scene object identifier in the received request and a three dimensional scene object identifier stored at that second computer, the processing by the second computers creating respective meshes of the retrieved three dimensional scene objects at a selected level of detail;

the second computers communicating in parallel the processed three dimensional scene object meshes to a graphics rendering processor of the first computer to create on said display a representation of the selected portion of the three dimensional scene assembled from the three dimensional scene object meshes communicated by the plurality of second computers to the first computer.

20. A computer system for rendering a three dimensional scene, comprising:

a first computer including a display;

a plurality of workstations operably coupled to the first computer by communication network;

each workstation storing three dimensional scene objects, the three dimensional scene objects stored by the workstations collectively representing a high resolution three dimensional scene;

the first computer storing an object identifier for each three dimensional scene object stored at the plurality of workstations; the first computer operable to send over said communication links a retrieval request to the plurality of workstations, the retrieval request including object identifiers and storage locations associated with a selected plurality of said stored three dimensional scene objects representing a selected portion of said three dimensional scene;

the workstations operable in parallel to retrieve and process three dimensional scene objects stored at individual ones of the workstations identified by the object identifiers in the retrieval request to create respective meshes of the retrieved three dimensional scene objects at a selected lower resolution and to communicate the processed three dimensional scene object meshes in parallel over the communication network to the first computer; and wherein the first computer includes a graphics processor operable to render the received three dimensional scene object meshes to create on said display a representation of said selected portion of the three dimensional scene.

21. A computer system for rendering a three dimensional scene, comprising:

a first computer including a graphics rendering pipeline and a display;

a plurality of workstations operably coupled to the first computer by communication network;

a database of three dimensional scene objects collectively representing a three dimensional scene, said database accessible by the workstations;

each workstation storing references to said database entries;

the first computer operable to send over said communication links a retrieval request to the plurality of workstations identifying a selected plurality of said stored three dimensional scene objects representing a selected view of said three dimensional scene;

the workstations operable in parallel to retrieve and process three dimensional scene objects based on the retrieval request to create respective meshes of the retrieved three dimensional scene objects at a selected level of detail and to effect parallel communication of the processed three dimensional scene object meshes over the communication network to the graphics rendering pipeline of the first computer; and wherein the first computer is operable to create on said display a representation of the selected view of the three dimensional scene assembled solely from the three dimensional scene object meshes received from the workstations.

22. The computer system as recited in claim 21, wherein the retrieval request specifies the location of each selected object in the three dimensional scene.

23. The computer system as recited in claim 21, wherein the three dimensional scene objects stored at the workstations include information concerning geometry, color and texture of the object.

24. The computer system as recited in claim 21, wherein the selected three dimensional scene objects are distributed in a predetermined manner amongst the plurality workstations for processing.

* * * * *

UNITED STATES PATENT AND TRADEMARK OFFICE
CERTIFICATE OF CORRECTION

| | | |
|---|---|---|
| PATENT NO. | : 7,042,454 B1 | Page 1 of 1 |
| APPLICATION NO. | : 09/428679 | |
| DATED | : May 9, 2006 | |
| INVENTOR(S) | : Adam L. Seligman | |

It is certified that error appears in the above-identified patent and that said Letters Patent is hereby corrected as shown below:

In column 4, line 40, delete "identifier" and insert -- identifiers --, therefor.

In column 6, line 58, in Claim 1, delete "request" and insert -- requests --, therefor.

In column 8, line 15, in Claim 9, delete "request" and insert -- requests --, therefor.

Signed and Sealed this

Nineteenth Day of October, 2010

David J. Kappos
*Director of the United States Patent and Trademark Office*